US008059112B2

(12) United States Patent
Park et al.

(10) Patent No.: US 8,059,112 B2
(45) Date of Patent: Nov. 15, 2011

(54) APPARATUS AND METHOD FOR BROADCASTING VISIBLE LIGHT INFORMATION IN VISIBLE LIGHT COMMUNICATION

(75) Inventors: Sung-Bum Park, Suwon-si (KR); Dae-Kwang Jung, Suwon-si (KR); Jeong-Seok Choi, Yongin-si (KR); Hong-Seok Shin, Suwon-si (KR); Kyung-Woo Lee, Yongin-si (KR); Dong-Jae Shin, Seoul (KR)

(73) Assignee: Samsung Electronics Co., Ltd (KR)

( * ) Notice: Subject to any disclaimer, the term of this patent is extended or adjusted under 35 U.S.C. 154(b) by 433 days.

(21) Appl. No.: 12/390,888

(22) Filed: Feb. 23, 2009

(65) Prior Publication Data

US 2009/0213099 A1 Aug. 27, 2009

(30) Foreign Application Priority Data

Feb. 22, 2008 (KR) ........................ 10-2008-0016326

(51) Int. Cl.
*G09G 3/00* (2006.01)
*H04B 10/00* (2006.01)

(52) U.S. Cl. ......................... 345/204; 345/690; 398/172

(58) Field of Classification Search ................ 345/3-35, 345/39, 44, 45, 102, 51, 87, 204, 690, 76-83, 345/691, 88; 398/172, 183, 198, 182, 189; 40/450, 451, 452, 463
See application file for complete search history.

(56) References Cited

U.S. PATENT DOCUMENTS 6,351,324 B1 * 2/2002 Flint .......................... 359/202.1
7,663,501 B2 2/2010 Hyun et al.
7,683,919 B2 * 3/2010 Asahi et al. .................. 345/690

FOREIGN PATENT DOCUMENTS

KR 100770918 10/2007

* cited by examiner

*Primary Examiner* — Nabil Z Hindi
(74) *Attorney, Agent, or Firm* — The Farrell Law Firm, P.C.

(57) ABSTRACT

Provided is a method for broadcasting visible light information in visible light communication. The method includes determining a time interval for a simultaneous signal and a time interval for an individual signal of information to be displayed on a display device; simultaneously modulating output signals of three Red-Green-Blue (RGB) Light Emitting Diodes (LEDs) making up one pixel, and transferring the modulated information to the display device; individually modulating output signals of the three RGB LEDs and transferring the modulated information to the display device; and displaying the modulated information for any selected one of the time interval for the simultaneous signal and the time interval for the individual signal.

10 Claims, 4 Drawing Sheets

APPARATUS AND METHOD FOR BROADCASTING VISIBLE LIGHT INFORMATION IN VISIBLE LIGHT COMMUNICATION

PRIORITY

This application claims priority under 35 U.S.C. §119(a) to a Korean Patent Application filed in the Korean Intellectual Property Office on Feb. 22, 2008 and assigned Serial No. 10-2008-16326, the disclosure of which is incorporated herein by reference.

BACKGROUND OF THE INVENTION

1. Field of the Invention

The present invention relates generally to broadcasting visible light information, and in particular, to an apparatus and method for broadcasting visible light information using multiplexing.

2. Description of the Related Art

The Ministry of Commerce, Industry and Energy (MOCIE), forecasts that Light Emitting Diodes (LED) will replace other existing lighting devices by 2015. As LEDs improve in light emitting efficiency and decrease in price, LEDs are becoming more popular not only in the special lighting market for portable devices, displays, automobiles, traffic lights, advertising electric bulletin boards, etc., but also in the normal lighting market for fluorescent lamps, incandescent lights, etc. In particular, the white LEDs have already reached parity with incandescent lamps in terms of the light emitting efficiency, and LED products superior even to fluorescent lighting are also available now.

Recently, study of wireless visible light communication based on visible LEDs, which are being conducted in many enterprises and research institutes as the interests in wireless optical technologies and are complementary to Radio Frequency (RF) technologies, has been increasing due to the exhaustion of RF frequencies, the possible interferences between several wireless communication technologies, the required increase in communication security, and the advent of the ultra-high-speed ubiquitous communication environment of the $4^{th}$ Generation (4G) wireless technology.

Lighting lamps, such as fluorescent lamps and incandescent lights now used in households, offices and public places, will be replaced in the near future by LEDs having high performance and high durability. Lighting LEDs can also be used as light sources for communication by modulating a current being applied to the LEDs that are used as lighting lamps. In other words, it is possible to transmit/broadcast data only with lighting LEDs, without additional light sources.

Delivering information using visible lights is advantageous in that visible light communication can provide visibility by which the communication link can be checked by the naked eye and can also guarantee reliable security. Visible light communication also has various uses and, in contrast with radio communication, visible light communication can be freely used without regulations. Visible light communication can also simultaneously perform lighting and communication functions. That is, in visible light communication, normal lighting equipment can transmit and receive information as a visible light communication transceiver, while simultaneously serving as a lighting source.

Visible light communication devices based on LED pixels adopt, as a communication scheme for displaying data, a communication scheme that transmits/receives data to/from each other using three colors of Red, Green, and Blue (RGB).

This visible light communication system performs data communication through instantaneous switching or adjusting of the visible lights.

FIGS. 1A and 1B are graphs illustrating data signals which are commonly modulated according to time and wavelength in visible light communication. FIG. 1A illustrates data signals obtained by simultaneously modulating output signals of three RGB LEDs, while FIG. 1B shows data signals created by individually modulating output signals of three RGB LEDs.

Referring to FIG. 1A, one modulated data signal is obtained by simultaneously modulating output signals of three RGB LEDs with the passage of time, and the modulated data signal corresponds to any one of a case where the three LEDs are all turned on and another case where the three LEDs are all turned off. The former case where the three LEDs are all turned on is suitable for long-distance communication where the modulated data signal can be received even at the location of a far-away user (for example, a user located far away from the LED display), as the signal is output in white. However, it is not possible to simultaneously transmit many data signals since only one data signal can be modulated at a time.

Next, referring to FIG. 1B, data communication is performed by modulating output signals of three RGB LEDs individually with the passage of time. When the output signals of three RGB LEDs are modulated individually, data transmission is possible using a combination of the RGB signals. However, the individual modulation of FIG. 1B can be used for short-distance communication where the data can be received by a nearby user (for example, a user located near the LED display), as the output power of the LED is low in comparison to the simultaneous modulation of FIG. 1A.

Accordingly, there is a demand for a method of transmitting necessary data by changing a modulation method for output signals of three RGB LEDs at stated intervals to satisfy both the far user and the near user.

SUMMARY OF THE INVENTION

An aspect of the present invention is to address at least the problems and/or disadvantages and to provide at least the advantages described below. Accordingly, an aspect of the present invention is to provide an apparatus and method capable of broadcasting data information to both a far user and a near user for different intervals by simultaneously modulating output signals of three LEDs for a specific time interval and individually modulating output signals of the three LEDs for another time interval in visible light communication.

According to one aspect of the present invention, there is provided a method for broadcasting visible light information in a visible light communication scheme. The method includes determining a time interval for a simultaneous signal of information to be displayed on a display device and a time interval for individual signals of information to be displayed on the display device; simultaneously modulating output signals of three Red-Green-Blue (RGB) Light Emitting Diodes (LEDs) constituting one pixel, and transferring the simultaneously modulated signals to the display device; individually modulating the output signals of each of the three RGB LEDs and transferring the individually modulated signals to the display device; and displaying the modulated information for any selected one of the time interval for the simultaneous signal and the time interval for the individual signals.

According to another aspect of the present invention, there is provided an apparatus for broadcasting visible light information in visible light communication. The apparatus includes three Red-Green-Blue (RGB) Light Emitting Diodes (LEDs) constituting one pixel; a combined driver for simultaneously modulating output signals of the three RGB LEDs for a time interval for a simultaneous signal; three drivers for individually modulating output signals of each of the three RGB LEDs for a time interval for an individual signal; three switches for selecting one of the simultaneous signal and the individual signal when switching occurs between the time interval for the simultaneous signal and the time interval for the individual signal; a time adjuster for adjusting the time interval for the simultaneous signal and the time interval for the individual signal; and a visible-light electric bulletin board for displaying information using at least one of the simultaneously modulated signal and the individually modulated signal.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF PREFERRED EMBODIMENTS

Preferred embodiments of the present invention will now be described in detail with reference to the annexed drawings. The matters defined in the description such as a detailed construction and elements are provided to assist in a comprehensive understanding of exemplary embodiments of the invention. Accordingly, those of ordinary skill in the art will recognize that various changes and modifications of the embodiment described herein can be made without departing from the scope and spirit of the invention.

As described above, the conventional method of modulating output signals of three RGB LEDs and displaying the modulated information for the user in the visible light communication may not satisfy both a user far from the LEDs and a user near the LEDs. To address these and other disadvantages, the present invention provides a new system capable of broadcasting data information and satisfying both a far user and a near user by simultaneously modulating or individually modulating output signals of three RGB LEDs at regular intervals. An internal structure of the present invention will be described in detail with reference to the accompanying drawings.

Figure 1A:
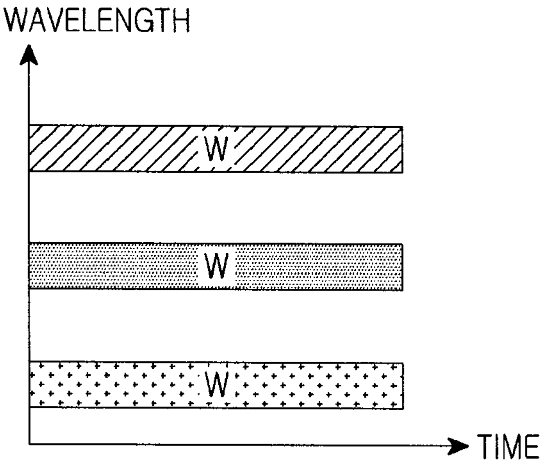
FIG. 1A (PRIOR ART)
FIGS. 1A and 1B are graphs illustrating data signals which are commonly modulated according to the time and wavelength in visible light communication
Figure 1B:
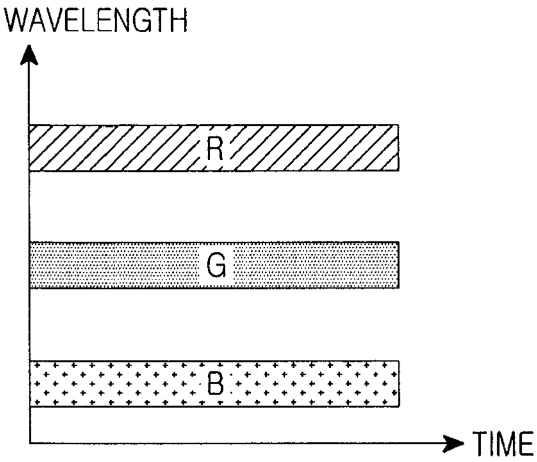
FIG. 1B (PRIOR ART)
Figure 2:
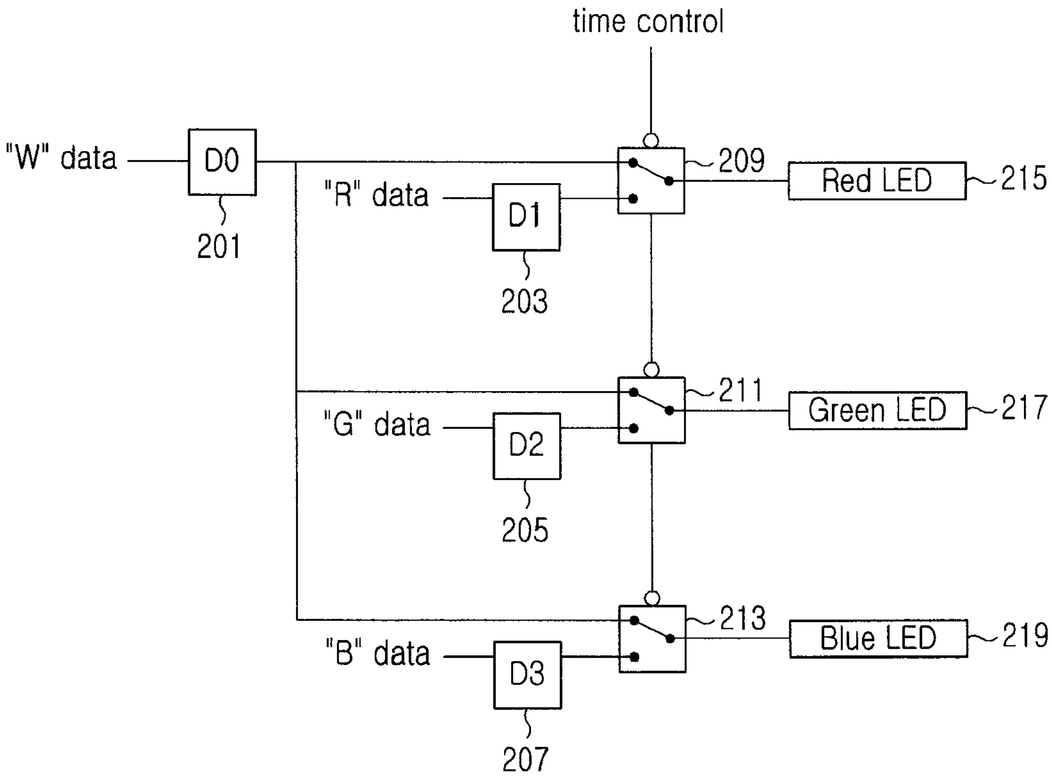
FIG. 2 is a diagram illustrating an internal structure of an RGB LED module according to an embodiment of the present invention.

FIG. 2 is a diagram illustrating an internal structure of an RGB LED module according to an embodiment of the present invention. In structure, the LED module includes three RGB LEDs 215, 217 and 219, a driver 201 for simultaneously modulating output signals of the three LEDs 215, 217, and 219, three drivers 203, 205, and 207 for individually modulating output signals of the three RGB LEDs 215, 217, and 219, and three switches 209, 211, and 213 capable of selecting one of the simultaneous modulation and individual modulation. A visible-light electric bulletin board, on which data signals are displayed after being modulated into graphic signals, includes LED modules consisting of three-color RGB LED arrays, a buffer for coupling the LED modules, and a Radio Frequency (RF) distributor for distributing data signals.

Referring to FIG. 2, a predetermined time period is divided into a time period for which output signals of the three RGB LEDs 215, 217, and 219 are simultaneously modulated, and a time period for which output signals of the three RGB LEDs 215, 217, and 219 are individually modulated, so that the simultaneous modulation and the individual modulation can be conducted at different time periods.

For the time interval where output signals of three RGB LEDs are simultaneously modulated, the output signals of the three RGB LEDs 215, 217, and 219 are simultaneously modulated into a data signal 'W' by using the driver 201 to simultaneously modulate the output signals of the three RGB LEDs 215, 217, and 219. In visible light communication, since three RGB colors are modulated at a time, the color displayed on the electric bulletin board can be seen at the user's eyes in one of the white color generated when a voltage is applied to all of the three RGB LEDs 215, 217 and 219 and the black color determined when no voltage is applied to the three RGB LEDs 215, 217, and 219. With a combination of the white color and the black color, one data signal can be delivered to the far user.

Next, for the time interval where output signals of the three RGB LEDs 215, 217, and 219 are modulated individually, the output signal of the Red LED 215 is modulated into a data signal 'R', the output signal of the Green LED 217 is modulated into a data signal 'G', and the output signal of the Blue LED 219 is modulated into a data signal 'B', using the drivers 203, 205, and 207 for individually modulating the output signals of the three RGB LEDs 215, 217, and 219, respectively. The modulated data signals are displayed on the electric bulletin board in their associated RGB colors, making it possible to deliver a large amount of data to a nearby user. An operation of driving three RGB LEDs to modulate their output signals individually at stated intervals is controlled by the switches 209, 211, and 213 connected between the three LEDs 215, 217, and 219 and the drivers 203, 205, and 207.

The switches 209, 211, and 213, which are connected to the three RGB LEDs 215, 217 and 219, respectively, alternately select the driver 201 for simultaneously modulating output signals of the three RGB LEDs 215, 217, and 219, and the drivers 203, 205, and 207 for individually modulating output signals of the three RGB LEDs 215, 217, and 219, thereby controlling the output signals of the three RGB LEDs 215, 217, and 219 in different ways at different times.

For the time interval assigned for the simultaneous modulation, the switches 209, 211, and 213 are connected to the driver 201 for simultaneously modulating output signals of the three RGB LEDs, and output the data signal generated by simultaneously modulating output signals of the three RGB LEDs 215, 217, and 219. Thereafter, for the time interval allotted for the individual modulation, the switches 209, 211, and 213 are connected to the drivers 203, 205, and 207 for individually modulating output signals of the three RGB LEDs, and output the data signals obtained by individually modulating output signals of the three RGB LEDs 215, 217, and 219.

Figure 3:
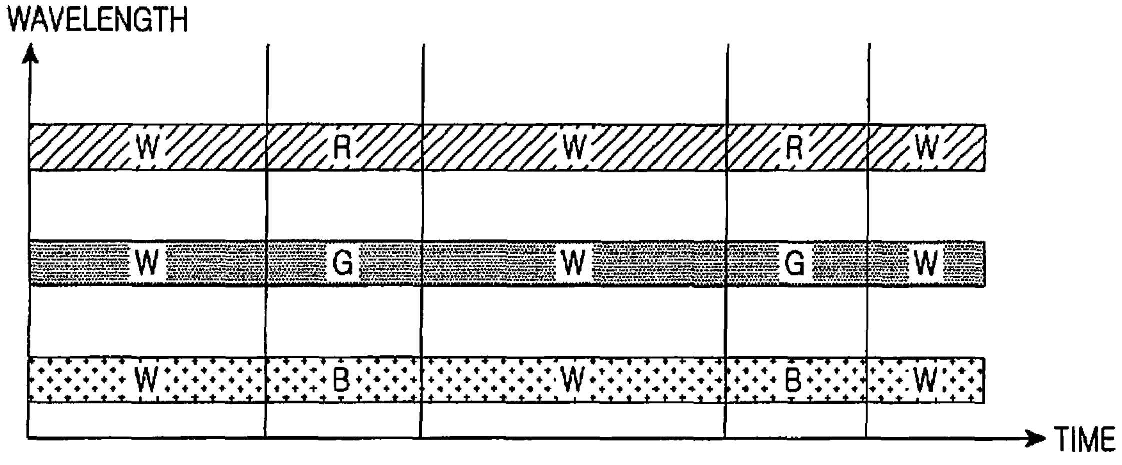
FIG. 3 is a graph illustrating data signals modulated in different ways depending on the time and wavelength in visible light communication according to an embodiment of the present invention.

The time interval assigned for simultaneously modulating output signals of the three RGB LEDs 215, 217, and 219 and the time interval for individually modulating output signals of the three RGB LEDs 215, 217, and 219 are alternately repeated until the data transmission is completed, which can be expressed in a graph as shown in FIG. 3.

FIG. 3 is a graph illustrating data signals modulated in different ways depending on the time and wavelength in visible light communication according to an embodiment of the present invention.

Referring to FIG. 3, a predetermined time period is divided, in turn, into a time period for which output signals of three RGB LEDs are simultaneously modulated and a time period for which output signals of the three RGB LEDs are individually modulated. The time division changes the modulation method for output signals of the three RGB LEDs at stated intervals. In this manner, the proposed method modulates output signals of the three RGB LEDs in different ways in their associated time intervals until it completes the data transmission at intervals.

When output signals of the three RGB LEDs are individually modulated, the amount of transmission data increases, disabling long-distance transmission. However, when output signals of the three RGB LEDs are simultaneously modulated, only one data signal is transmitted, securing the long-distance transmission. This process will be described below by way of an embodiment.

Figure 4A:
FIGS. 4A and 4B are diagrams illustrating an example of an electric bulletin board through which data signals are output by modulating output signals of three RGB LEDs in different ways at predetermined intervals according to an embodiment of the present invention.
Figure 4B:
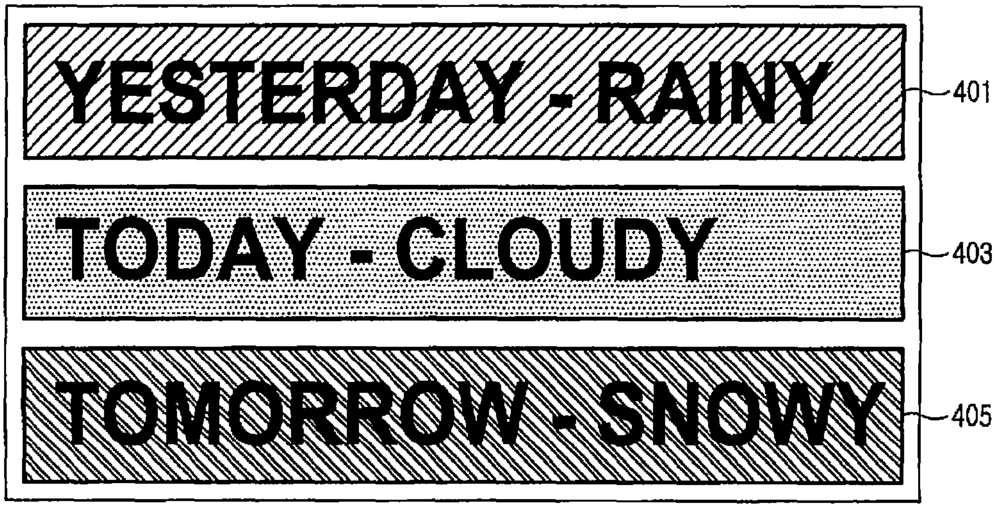

FIGS. 4A and 4B are diagrams illustrating an example of an electric bulletin board through which data signals are output by modulating output signals of three RGB LEDs in different ways at predetermined intervals according to an embodiment of the present invention.

Assume that a word such as 'Weather' is displayed in black and white on an electric bulletin board by simultaneously modulating output signals of three RGB LEDs for a specific interval, and the weather reports for yesterday, today and tomorrow are displayed in different colors by individually modulating output signals of the three RGB LEDs for anther interval. Then, the near users can read all the displayed data, but the far users can see only the word 'Weather' which is output by simultaneously modulating output signals of the three RGB LEDs. In this case, users who need detailed weather information can approach the electric bulletin board and get the detailed weather reports for yesterday, today and tomorrow, which are displayed on the electric bulletin board for the next time interval. The displayed weather reports for yesterday, today, and tomorrow vary in color and brightness. As illustrated in FIG. 4B, for example, the weather reports for yesterday (401), today (403), and tomorrow (405) can be red, green, and blue, respectively.

Figure 5:
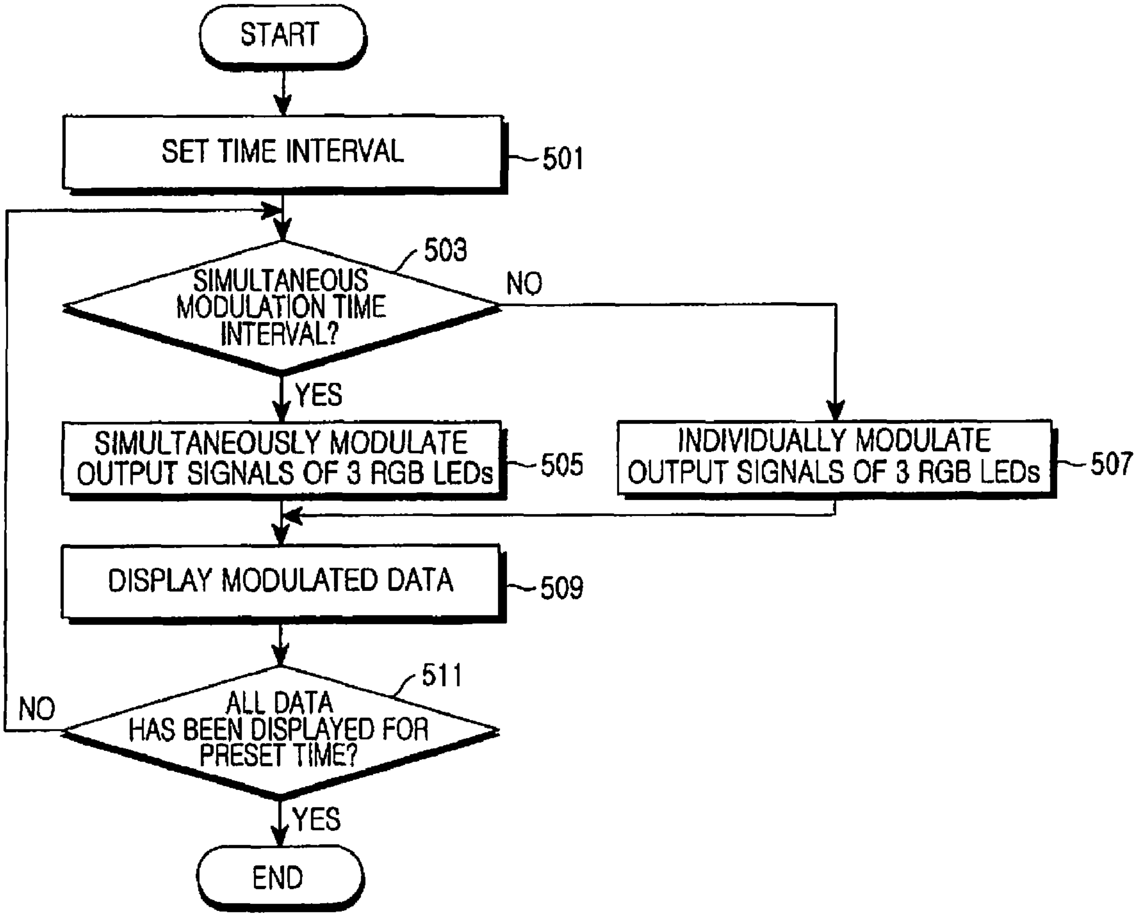
FIG. 5 is a flowchart illustrating a process of modulating output signals of three RGB LEDs in different ways at different times according to an embodiment of the present invention.

FIG. 5 is a flowchart illustrating a process of modulating output signals of three RGB LEDs in different ways at different times according to an embodiment of the present invention.

Referring to FIG. 5, in step 501, a method proposed by the present invention determines a time interval assigned for simultaneously modulating and displaying output signals of three RGB LEDs and a time interval for individually modulating and displaying output signals of the three RGB LEDs. After determining the time intervals, the proposed method determines in step 503 whether the current time corresponds to the time interval for the simultaneous modulation. If the current time corresponds to the time interval for the simultaneous modulation, the proposed method simultaneously modulates output signals of the three RGB LEDs in step 505, and displays the output signals on an electric bulletin board in step 509, allowing the users far away from the bulletin board to read the displayed data. However, if the current time corresponds to the time interval for the individual modulation, the proposed method individually modulates output signals of the three RGB LEDs in step 507, and displays them on the electric bulletin board in step 509, permitting users closer to the bulletin board to read more detailed data. If the far user wants to acquire the detailed information, the far user can come closer to the electric bulletin board to get the detailed data.

Thereafter, the proposed method determines in step 511 whether the electronic bulletin board has displayed all the data for a predetermined time. The proposed method repeatedly performs the process of steps 503 to 509 until all the data is displayed for the predetermined time.

With the above one structure, the invention can simultaneously modulate or individually modulate output signals of three RGB LEDs in different time intervals, thereby enabling data information broadcasting that can deliver necessary data to the user regardless of whether the user is located near to or far from the electric bulletin board.

As is apparent from the foregoing description, with one structure, the visible light communication system according to the present invention can simultaneously modulate output signals of three RGB LEDs for a specific time interval and individually modulate output signals of the three RGB LEDs for another time interval, making it possible to broadcast data information to both the far user and the near user at different times.

While the invention has been shown and described with reference to a certain preferred embodiment thereof, it will be understood by those having ordinary skill in the art that various changes in form and detail may be made therein without departing from the spirit and scope of the invention as defined by the appended claims.

What is claimed is:

1. A method for broadcasting visible light information in a visible light communication scheme, the method comprising:

determining a time interval for a simultaneous signal of information to be displayed on a display device and a time interval for individual signals of information to be displayed on the display device;

simultaneously modulating output signals of three Red-Green-Blue (RGB) Light Emitting Diodes (LEDs) constituting one pixel, and transferring the simultaneously modulated signals to the display device;

individually modulating the output signals of each of the three RGB LEDs and transferring the individually modulated signals to the display device; and displaying the modulated information for any selected one of the time interval for the simultaneous signal and the time interval for the individual signals.

2. The method of claim 1, wherein the time interval for the simultaneous signal and the time interval for the individual signals are previously adjusted by means of a time adjuster.

3. The method of claim 1, wherein simultaneously modulating the output signals comprises:

simultaneously modulating the output signals of the three RGB LEDs for the time interval for the simultaneous signal; and transferring the simultaneously modulated output signals to the display device.

4. The method of claim 1, wherein individually modulating the output signals further comprises:

individually modulating output signals of the three RGB LEDs for the time interval for the individual signal; and transferring at least one of the individually modulated output signals to the display device.

5. The method of claim 1, wherein the displaying the modulated information comprises:

displaying information obtained by simultaneously modulating output signals of the three RGB LEDs, on the display device for the time interval for the simultaneous signal; and displaying information obtained by individually modulating output signals of the three RGB LEDs, on the display device for the time interval for the individual signal.

6. An apparatus for broadcasting visible light information in visible light communication, the apparatus comprising:

three Red-Green-Blue (RGB) Light Emitting Diodes (LEDs) constituting one pixel;

a combined driver for simultaneously modulating output signals of the three RGB LEDs for a time interval for a simultaneous signal;

three drivers for individually modulating output signals of each of the three RGB LEDs for a time interval for an individual signal;

three switches for selecting one of the simultaneous signal and the individual signal when switching occurs between the time interval for the simultaneous signal and the time interval for the individual signal;

a time adjuster for adjusting the time interval for the simultaneous signal and the time interval for the individual signal; and a visible-light electric bulletin board for displaying information using at least one of the simultaneously modulated signal and the individually modulated signal.

7. The apparatus of claim 6, wherein the combined driver for simultaneous modulation simultaneously controls the three switches for the time interval for the simultaneous signal to display desired information using the simultaneously modulated signal.

8. The apparatus of claim 6, wherein the three drivers for individual modulation control the three switches for the time interval for the individual signal, respectively, to display desired information using the individually modulated signal.

9. The apparatus of claim 6, wherein the switches connect the simultaneously modulated signal to a display device under a control of the combined driver for the simultaneous modulation for the time interval for the simultaneous signal, and connect the individually modulated data to the display device under control of the three derivers for the individual modulation for the time interval for the individual signal.

10. The apparatus of claim 6, wherein the visible-light electric bulletin board further comprises:

an LED module including a plurality of RGB LED arrays;

a driver capable of modulating output signals of a plurality of RGB LED arrays;

a buffer for connecting the LED module to the driver; and a Radio Frequency (RF) distributor for performing signal distribution on information to be displayed for a user.

* * * * *